United States Patent Office 3,413,434
Patented Nov. 26, 1968

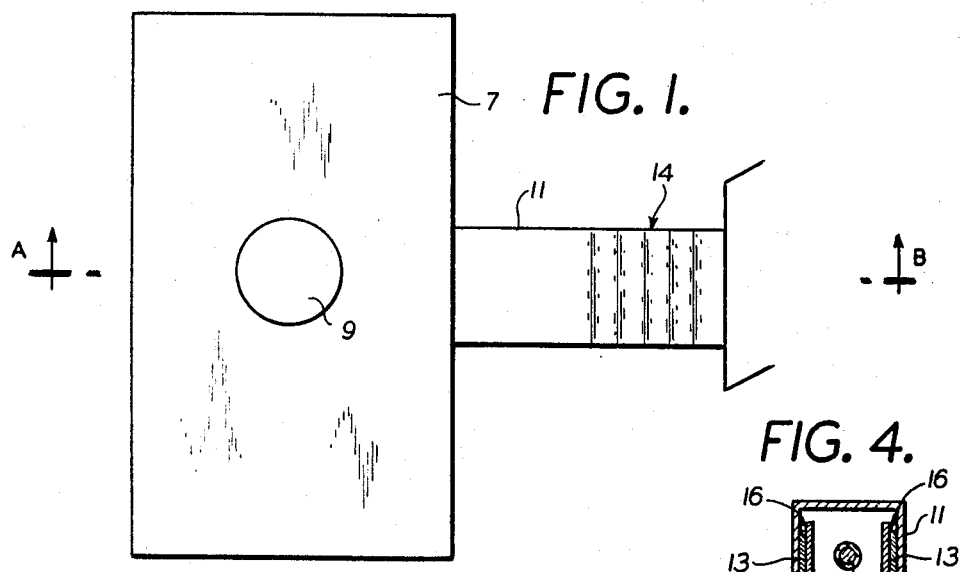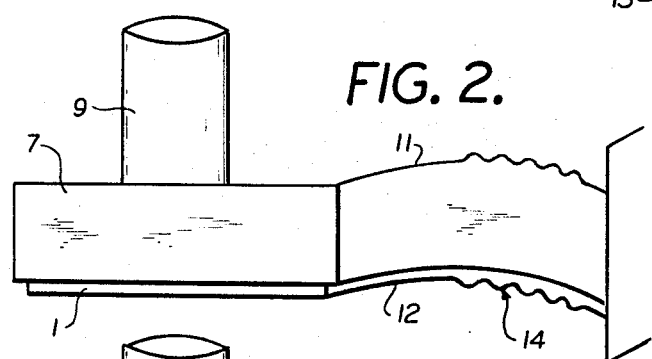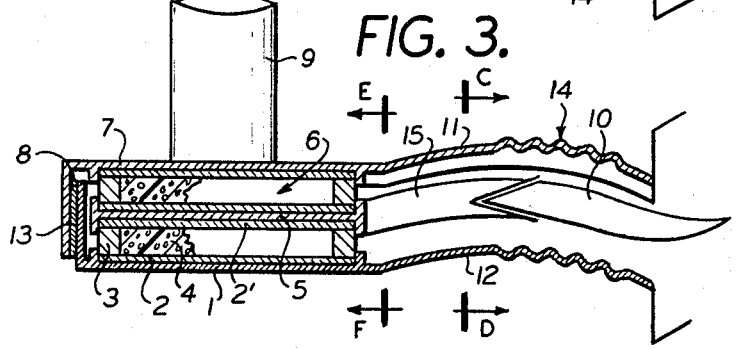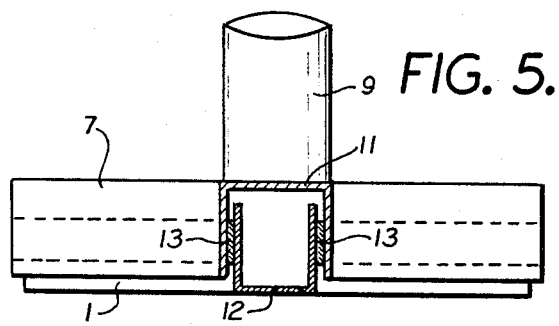

3,413,434
PRODUCTION OF STRUCTURAL ELEMENTS HAVING A FOAM-PLASTIC CORE IN AN ELECTRIC HIGH FREQUENCY FIELD
Helmut Mandel, Reibach uber Dieburg, Germany, assignor to Dorplastex A.G., Zug, Switzerland, a corporation of Switzerland
Filed Sept. 14, 1965, Ser. No. 487,245
5 Claims. (Cl. 219—10.67)

ABSTRACT OF THE DISCLOSURE

An apparatus, for producing structural units containing a plastic foam core in an electric high frequency field, has an outer, grounded electrode in two-part overlapping formation that surrounds an inner counter electrode entirely screened by the outer electrode and being fed by high frequency voltage. The structural units to be produced are placed between one part of the outer electrode and the counter electrode.

---

Blocks and boards of foam plastic are produced in known manner in steam operated molds. The prefoamed porous polystyrene containing expansion agent is filled into a box mold and steam is conducted from a steam chamber through the perforated walls of the mold into the material which has been suitably pretreated with a view of obtaining good foaming and welding together of the material.

For the foaming of molded parts which are closed on all sides, as for instance sandwich boards surrounded by wooden frames and having chip boards on both sides, this method cannot be employed since there is no possibility of introducing steam nor is this method advisable in the manufacture of long plastic foam walls in which the polystyrene present between steam-impermeable solid materials of sheet metal or plastic could only be foamed by steam shocks acting from two opposite narrow sides. In the case of such long, thin walls, a dependable foaming of the polystyrene of exceptional layer thicknesses cannot always be expected.

For this purpose, in accordance with the invention, foaming under the control of an electric high-frequency field has now been found suitable and it has become possible, to foam parts of large surface, for instance structural parts having polystyrene foam as core or center layer. In this connection, the prefoamed granulate particules, after being wetted with water containing an electrolyte, are introduced into a mold into which the parts on which the foaming is to be effected have been previously inserted.

Due to the electrical heating of the water, the further expanding and welding together of the raw materials of the plastic foam take place under the control of the high-frequency field.

In the prior high-frequency heating arrangement described above, it has been found particularly disadvantageous that a large amount of energy is lost by radiation so that in addition to the measures directed at reducing the loss of energy, special measures are necessary to electrically screen the apparatus; in this connection, it has been found useful for the efficiency of the installation—although, to be sure, at considerable expense—completely to screen off the entire installation, i.e., generator, feed line and accessories.

One of the objects of the present invention is to reduce, if not eliminate these disadvantages by simple and effective means and to produce structural parts with plastic foam in an advantageous, dependable manner in which the losses of energy are reduced to a minimum and no particularly costly screening measures are necessary.

A more specific object of the invention, is a foaming device or arrangement of box like configuration having upper and lower halves with raised edges overlappingly engaging each other, and forming a common high frequency electrode lying at ground potential, known as the cold electrode; the cold electrode surrounds a second or counter-electrode which is under high frequency voltage and is known as the hot electrode, forming an electric screen for the counter electrode. As a result of the structural configuration and arrangement of the electrodes, the emergence of substantial high-frequency fields which might have a disturbing effect on radio reception is sufficiently prevented, in compliance with government requirements.

By arranging the hot electrode at approximately mid-height of the foaming apparatus, as a further advantage, simultaneously two structural units of large surface can be foamed.

These and other objects of the invention will be made more fully apparent from the drawings annexed herein, in which:

FIGS. 1 and 2 represent in top and side views, respectively, an invention arrangement embodying certain features of the invention.

FIGS. 3 to 5 are sections along the line AB of FIG. 1, and along lines CD and EF of FIG. 3, respectively.

In the drawings part 1 represents the lower half of a box-like structure or apparatus consisting of steel or aluminum plate. Part 1 has laterally raised edges to receive the parts of the material or structural unit to be foamed, such as chipboard 2, wooden frame 3, foamable filling 4 and another chipboard 2'. A hot counter-electrode plate is mounted at 5. On top of electrode plate 5 a second structural unit 6 of the same or similar type as the lower unit 2, 3, 4, 2' is preassembled. The second structural unit 6 is then covered by the second half 7 of the box-like configuration. Upper and lower box halves 1 and 7 respectively are connected by means of a receiving mandrel 9 with a press.

Electric energy is applied to the hot electrode 5 from a feeder line 10 which is screened by protective jackets 11, 12 consisting of copper plate. Jackets 11, 12 are also of box-like construction and have their raised edges overlappingly engaging each other.

To assure equal potential at outer electrodes 1 and 7 of the foaming apparatus and at protective jackets 11 and 12 of line 10, and in order to complete the screening effect, there are provided, as electric seal, strips 13 of material of good galvanic conduction, preferably copper which can be inserted under pressure in spaces 8 and 16 between the raised edges of the two apparatus halves 1 and 7 and the two protective jackets 11 and 12 respectively.

In order to increase the mobility of the feeder line 10 in vertical direction and to facilitate preassembly of the structural units outside the press and improve accessibility to the foaming mold 24, part of the protective jackets 11, 12 are formed as a corrugated tube 14 and feeder line 10 is connected with hot electrode 5 by means of sliding contact 15.

While the invention has been shown and described by way of certain materials, forms, arrangements and connections of electrical and mechanical elements, the invention is not limited thereto, but may be applied in any form or manner whatsoever without departing from the scope of this disclosure.

I claim:
1. An apparatus, for use in producing structural units containing a plastic foam core in an electric high frequency field, comrpising an outer electrode of two-part formation, each part comprising a base portion and side portions extending from the base portion, the side portion of one part being in telescoping relation with that of the other, means electrically interconnecting said two side portions, means grounding said outer electrode, an inner counter electrode entirely surrounded by said outer electrode thus being screened by the outer electrode, and means operable for applying high frequency electric current to the counter electrode, said structural units being adapted to be placed between the base portion of one part of the outer electrode and the counter electrode.

2. An apparatus, according to claim 1, metallic screening means of two-part formation surrounding said means for applying high frequency electric current, each part of said screening means including a base portion and side portions extending from the respective base portion, the extending side portions of said screening means being in overlapping engagement relative to each other, and means electrically conductively interconnecting said two side portions of said screening means.

3. An apparatus, according to claim 2, wherein said metallic screening means are connected electrically conductively to the outer electrode.

4. An apparatus, according to claim 1, wherein the means for the electrical interconnection of the side portions of the outer parts of the outer electrode include galvanically well conducting materials slidably arranged between the side portions, with pretension.

5. An apparatus, according to claim 2, wherein the means for the electrically conducting connection of the side portions of said screening means include galvanically well conducting material, slidably arranged between the side portions with pretension.

References Cited
UNITED STATES PATENTS

| | | | |
|---|---|---|---|
| 2,575,604 | 11/1951 | Thompson | 219—10.53 X |
| 3,010,157 | 11/1961 | Cizek | 219—10.53 X |
| 2,948,929 | 8/1960 | Stallard | 219—10.53 X |

FOREIGN PATENTS

| | | |
|---|---|---|
| 621,099 | 4/1949 | Great Britain. |
| 754,073 | 9/1956 | Great Britain. |

RICHARD M. WOOD, *Primary Examiner.*

L. H. BENDER, *Assistant Examiner.*